(12) United States Patent
Hoover

(10) Patent No.: US 6,260,769 B1
(45) Date of Patent: Jul. 17, 2001

(54) IRRIGATION ASSEMBLY

(76) Inventor: Allen E. Hoover, 5835 N. Forest Glen Ave., Chicago, IL (US) 60646

( * ) Notice: Subject to any disclaimer, the term of this patent is extended or adjusted under 35 U.S.C. 154(b) by 0 days.

(21) Appl. No.: 09/406,990

(22) Filed: Sep. 28, 1999

(51) Int. Cl.⁷ .................................................. A01G 27/00
(52) U.S. Cl. ........................................... 239/145; 239/536
(58) Field of Search ............................... 239/116, 120, 239/145, 207, 266, 267, 268, 450, 536, 553, 565, 566, 273, 542

(56) References Cited

U.S. PATENT DOCUMENTS

| | | | |
|---|---|---|---|
| 2,807,505 | * | 9/1957 | Weitzel ................................. 239/267 |
| 3,080,124 | * | 3/1963 | Rathmann ............................. 239/450 |
| 3,736,755 | * | 6/1973 | Hammond et al. ................... 239/542 |
| 3,777,987 | * | 12/1973 | Alljport ................................. 239/542 |
| 3,887,138 | * | 6/1975 | Gilead ................................... 239/542 |
| 3,941,342 | | 3/1976 | Bradshaw ............................... 248/88 |
| 4,948,295 | * | 8/1990 | Pramsoler ............................. 239/542 |

* cited by examiner

*Primary Examiner*—Lesley D. Morris
*Assistant Examiner*—Jorge S. Bocanegra

(57) ABSTRACT

Disclosed is an irrigation assembly that comprises a soaker hose having a liquid permitting region and a liquid barrier, which preferably is a tube that is disposed concentrically about a portion of said liquid permitting region and is axially movable relative thereto. The tube is water-impermeable such that water flowing through the soaker hose is not permitted to exit the hose along the axial region of the liquid permitting portion that is covered by the tube.

5 Claims, 1 Drawing Sheet

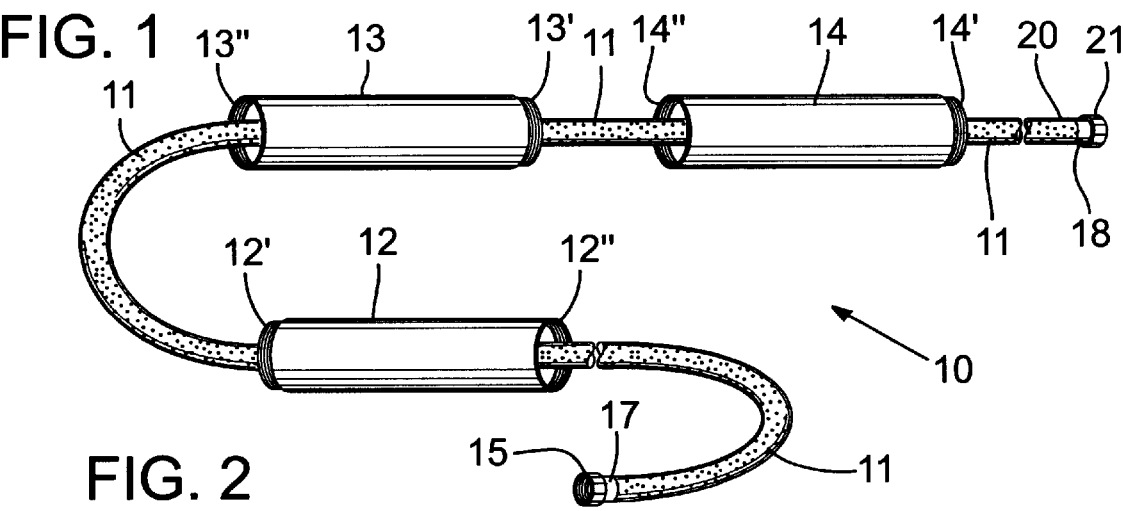
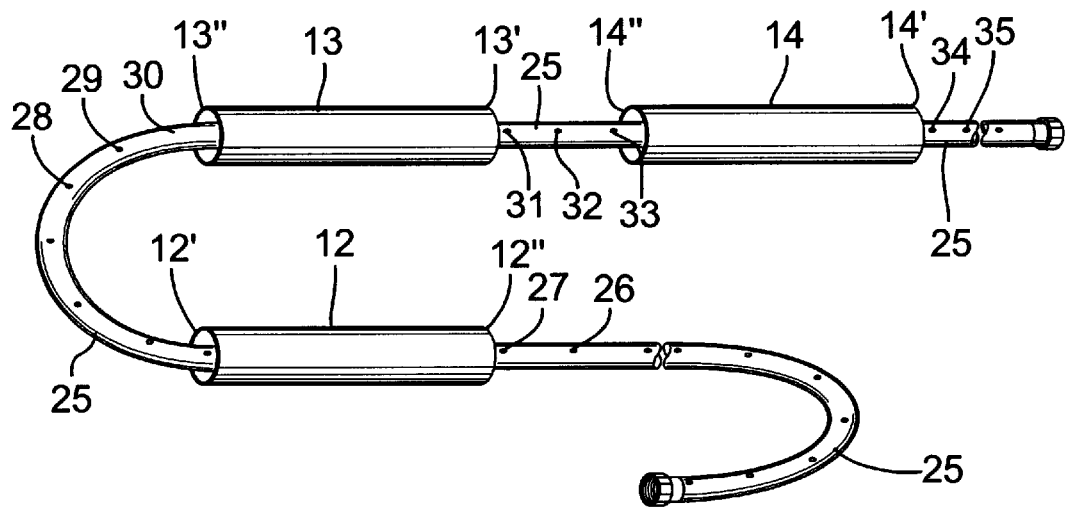
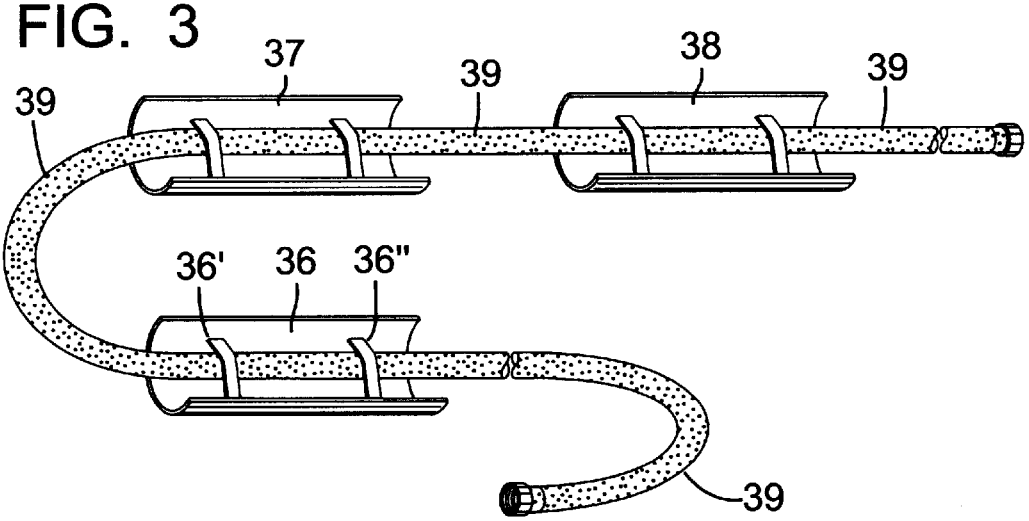

IRRIGATION ASSEMBLY

TECHNICAL FIELD OF THE INVENTION

The invention is in the area of irrigation, more particularly soaker hose irrigation.

BACKGROUND

The term "soaker hose" refers to a flexible hose that allows water to exit the soaker hose continuously or intermittently along the axial length of the hose. Soaker hoses typically are used in landscaping applications to irrigate individual plants or planting areas or small grassy areas. Typical soaker hoses either are uniformly porous along the axial length of the hose to allow water to slowly seep through the wall of the hose, or have a plurality of apertures spaced apart axially along the length of the hose to permit water to flow from regularly intermittent portions of the hose.

One problem with conventional soaker hoses is that it is not possible to eliminate the flow of water from the hose in any particular axial region of the hose. Thus, for example, if the soaker hose is to be used to irrigate two planting areas separated by a sidewalk, the soaker hose must be placed across the sidewalk to irrigate both planting areas, thus undesirably causing water to flow onto the sidewalk. This drawback with known soaker hoses can cause wastage of water and creation of potentially slippery and dangerous walkways.

THE INVENTION

The invention overcomes this problem by providing an irrigation assembly that comprises a soaker hose having a liquid permitting region and a liquid barrier, which preferably is a tube that is disposed concentrically about a portion of the liquid permitting region and is axially movable relative thereto. The tube is impermeable to the water (or other liquid flowing through the soaker hose) such that water flowing through the soaker hose is not permitted to exit the assembly at axial positions along the region of the liquid permitting portion that is covered by the tube. Preferably, the assembly includes a plurality of tubes that couple with one another to form a substantially fluid-tight coupling and to thereby effectively create a barrier of the combined axial length of the coupled tubes.

Thus, for example, when the assembly is used to irrigate two planting areas separated by a sidewalk, the assembly may be positioned such that the soaker hose crosses the sidewalk and such that the tubes are disposed in the axial region of the hose proximal the sidewalk. The planting areas then may be irrigated without causing water to flow onto the sidewalk.

BRIEF DESCRIPTION OF THE DRAWINGS

FIG. 1 is a perspective view of one embodiment of the irrigation assembly of the invention.

FIG. 2 is a perspective view of a second embodiment of the irrigation assembly of the invention.

FIG. 3 is a perspective view of a third embodiment of the irrigation assembly of the invention.

DESCRIPTION OF PREFERRED EMBODIMENTS

With reference now to FIG. 1, the illustrated assembly 10 comprises a soaker hose 11 and a plurality of tubes 12, 13, 14 (three are shown in FIG. 1, but the number of tubes may be greater or smaller, as is desired). The soaker hose is of a conventional type and is uniformly porous along the axial length thereof to permit water to seep slowly therethrough. The hose includes a faucet coupling 15 at a water inlet end 17 and a hose coupling 18 at a water outlet end 20. As is illustrated, the water outlet end 20 may include a cap 21. The soaker hose may have one or more water-impermeable portions (not shown), for example, at either end.

The tubes 12, 13, 14 are made of a water-impermeable material, such as polyvinyl chloride or another suitable polymer. In accordance with the invention, the tubes are disposed concentrically about a portion of the soaker hose 11, and at least one of the tubes, and preferably all of the tubes, are axially movable with respect to the liquid permitting portion of the soaker hose 11. The tubes, which in the illustrated embodiment are generally in the form of a right circular cylinder, preferably include a first coupling portion 12', 13', 14' disposed at one end and a second coupling portion 12", 13", 14" disposed at the other end. Any one of the coupling portions engages and couples with an adjacent coupling portion on an adjacent tube, such that any one tube (e.g. 12) can be coupled to an axially adjacent tube (e.g. 13) in a fluid-tight manner. Preferably, the coupling portions comprise mating threaded ends of the tubes.

FIG. 2 illustrates an alternative embodiment of the invention wherein the soaker hose 25 includes plural apertures 26–35 spaced apart axially along the length of the soaker hose. FIG. 3 illustrates another alternative embodiment of the invention wherein the liquid barrier members are not tubes, but are curved members 36, 37, 38 each including a channel for carrying away the water that seeps from the hose 39 and including straps (e.g. 36', 36") for securing the barrier member to the soaker hose.

While particular embodiments of the invention have been shown, it will be understood that the invention is not limited thereto since modifications may be made by those skilled in the art, particularly in light of the foregoing teachings. For example, the fluid flowing through the hose may be a fluid other than water; similarly, the soaker hose or the barrier members may take a configuration other than those configurations illustrated herein. It is, therefore, contemplated by the appended claims to cover any such modifications as incorporate those features which constitute the essential features of these improvements within the true spirit and scope of the invention.

What is claimed is:

1. An irrigation assembly comprising:

a flexible soaker hose having a liquid inlet end for coupling to a liquid source and having a liquid permitting region along at least a portion of the axial length thereof; and a plurality of liquid-impermeable tubes each disposed concentrically about a portion of the liquid permitting region of said soaker hose, at least one of said tubes being axially movable relative to said soaker hose, wherein said plurality of tubes includes at least a first tube and a second tube, said second tube being axially movable relative to said liquid permitting region to a position immediately adjacent to said first tube, said first tube having a first coupling portion and said second tube having a second coupling portion for coupling to said first coupling portion to form a substantially liquid-tight coupling.

2. An irrigation assembly according to claim 1, said soaker hose having a wall of substantially uniform porosity along said liquid permitting region for allowing seepage of liquid therethrough.

3. An irrigation assembly according to claim 1, said soaker hose having a wall made of a substantially nonporous material, said wall having a plurality of liquid flow apertures spaced apart axially along said liquid permitting portion.

4. An irrigation assembly according to claim 1, wherein said first and second coupling portions comprise threaded portions.

5. An irrigation assembly comprising:
- a flexible soaker hose having a liquid inlet end for coupling to a liquid source and having a liquid permitting region along at least a portion of the axial length thereof for irrigation of a surface, and
- a plurality of liquid-barrier members each disposed between said liquid permitting region of said soaker hose and said surface, at least one of said liquid barrier members being axially movable along the length of said liquid permitting region, wherein said plurality of liquid barrier members includes at least a first liquid barrier member and a second liquid barrier member, said second liquid barrier member being axially movable relative to said liquid permitting region to a position immediately adjacent to said first liquid barrier member, said first liquid barrier member having a first coupling portion and said second liquid barrier member having a second coupling portion for coupling to said first coupling portion to form a substantially liquid-tight coupling.

* * * * *